(12) United States Patent
Hisamura et al.

(10) Patent No.: US 12,257,969 B2
(45) Date of Patent: Mar. 25, 2025

(54) OFF-ROAD VEHICLE, REINFORCING FRAME, AND METHOD FOR TRANSPORTING OFF-ROAD VEHICLE

(71) Applicant: KAWASAKI MOTORS, LTD., Hyogo (JP)

(72) Inventors: Takashi Hisamura, Akashi (JP); Naoki Kawaguchi, Akashi (JP); Yuji Yokoyama, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 116 days.

(21) Appl. No.: 18/327,283

(22) Filed: Jun. 1, 2023

(65) Prior Publication Data

US 2024/0399993 A1    Dec. 5, 2024

(51) Int. Cl.
*B60R 21/13* (2006.01)

(52) U.S. Cl.
CPC ........ *B60R 21/13* (2013.01); *B60R 2021/132* (2013.01)

(58) Field of Classification Search
CPC .......................... B60R 21/13; B60R 2021/132
USPC .......................................................... 280/756
See application file for complete search history.

(56) References Cited

U.S. PATENT DOCUMENTS

| | | | |
|---|---|---|---|
| 7,523,977 B2* | 4/2009 | Fallis, III | B60J 7/0053 |
| | | | 296/107.09 |
| 10,035,408 B2* | 7/2018 | Crismon | B60J 7/11 |
| 10,857,962 B2* | 12/2020 | Ficheux | B62D 33/0617 |
| 2007/0194604 A1* | 8/2007 | Nygaard | B60R 21/13 |
| | | | 296/187.09 |
| 2008/0129025 A1* | 6/2008 | Ratajski | B62D 25/06 |
| | | | 296/187.03 |
| 2009/0085376 A1* | 4/2009 | Schmitt | B60R 21/13 |
| | | | 296/190.03 |
| 2012/0056411 A1* | 3/2012 | Nakamura | B62D 33/037 |
| | | | 296/65.01 |
| 2021/0031598 A1* | 2/2021 | Wilson, III | B60R 21/13 |
| 2021/0300472 A1 | 9/2021 | Thomas et al. | |

* cited by examiner

*Primary Examiner* — Toan C To
(74) *Attorney, Agent, or Firm* — Studebaker Brackett PLLC

(57) ABSTRACT

An off-road vehicle includes: a vehicle body frame to which a roll-over protection structure (ROPS) is detachably attachable; and a reinforcing frame that is detachably attachable to the vehicle body frame instead of the ROPS. The vehicle body frame includes a first vehicle body frame located forward of a driver's seat, and a second vehicle body frame located rearward of the driver's seat. The reinforcing frame couples the first vehicle body frame and the second vehicle body frame to each other.

15 Claims, 6 Drawing Sheets

OFF-ROAD VEHICLE, REINFORCING FRAME, AND METHOD FOR TRANSPORTING OFF-ROAD VEHICLE

FIELD

The technique disclosed here relates to an off-road vehicle, a reinforcing frame, and a method for transporting the off-road vehicle.

BACKGROUND

U.S. Patent Application Publication No. 2021/0300472 discloses an off-road vehicle in which a roll-over protection structure (ROPS) is attached to an upper portion of the vehicle.

SUMMARY

In vehicle transportation, to transport a vehicle efficiently, the vehicle is preferably compact in size. In an off-road vehicle equipped with a ROPS, the off-road vehicle can be made compact by detaching the ROPS. However, in transporting an off-road vehicle by a track or other vehicles, a vehicle body frame might be deformed under a load applied to the vehicle body frame.

It is therefore an object of the technique disclosed here to efficiently transport an off-road vehicle.

An off-road vehicle disclosed herein includes: a vehicle body frame to which a roll-over protection structure (ROPS) is detachably attachable; and a reinforcing frame that is replaceable with the ROPS and is detachably attachable to the vehicle body frame, wherein the vehicle body frame includes a first vehicle body frame and a second vehicle body frame, the first vehicle body frame being located forward of a driver's seat, the second vehicle body frame being located rearward of the driver's seat, and the reinforcing frame couples the first vehicle body frame and the second vehicle body frame to each other.

A reinforcing frame disclosed here is a reinforcing frame that is attached to an off-road vehicle during transportation of the off-road vehicle, the reinforcing frame being detachably attachable to a vehicle body frame of the off-road vehicle instead of a ROPS, and operable to couple a first vehicle body frame and a second vehicle body frame to each other, the first vehicle body frame being located forward of a driver's seat of the off-road vehicle, the second vehicle body frame being located rearward of the driver's seat.

A method for transporting an off-road vehicle is a method for transporting an off-road vehicle including a vehicle body frame to which a ROPS is attachable, and the method includes: attaching a reinforcing frame replacing with the ROPS to the vehicle body frame before transportation of the off-road vehicle, the reinforcing frame operable to couple a first vehicle body frame and a second vehicle body frame of the vehicle body frame to each other, the first vehicle body frame being located forward of a driver's seat of the off-road vehicle, the second vehicle body frame being located rearward of the driver's seat; transporting the off-road vehicle to which the reinforcing frame is attached; and detaching the reinforcing frame from the vehicle body frame and attaching the ROPS to the vehicle body frame, after transportation of the off-road vehicle.

The off-road vehicle enables efficient transportation of the off-road vehicle.

The reinforcing frame enables efficient transportation of the off-road vehicle.

The method for transporting an off-road vehicle enables efficient transportation of the off-road vehicle.

DESCRIPTION OF EMBODIMENTS

Figure 1:
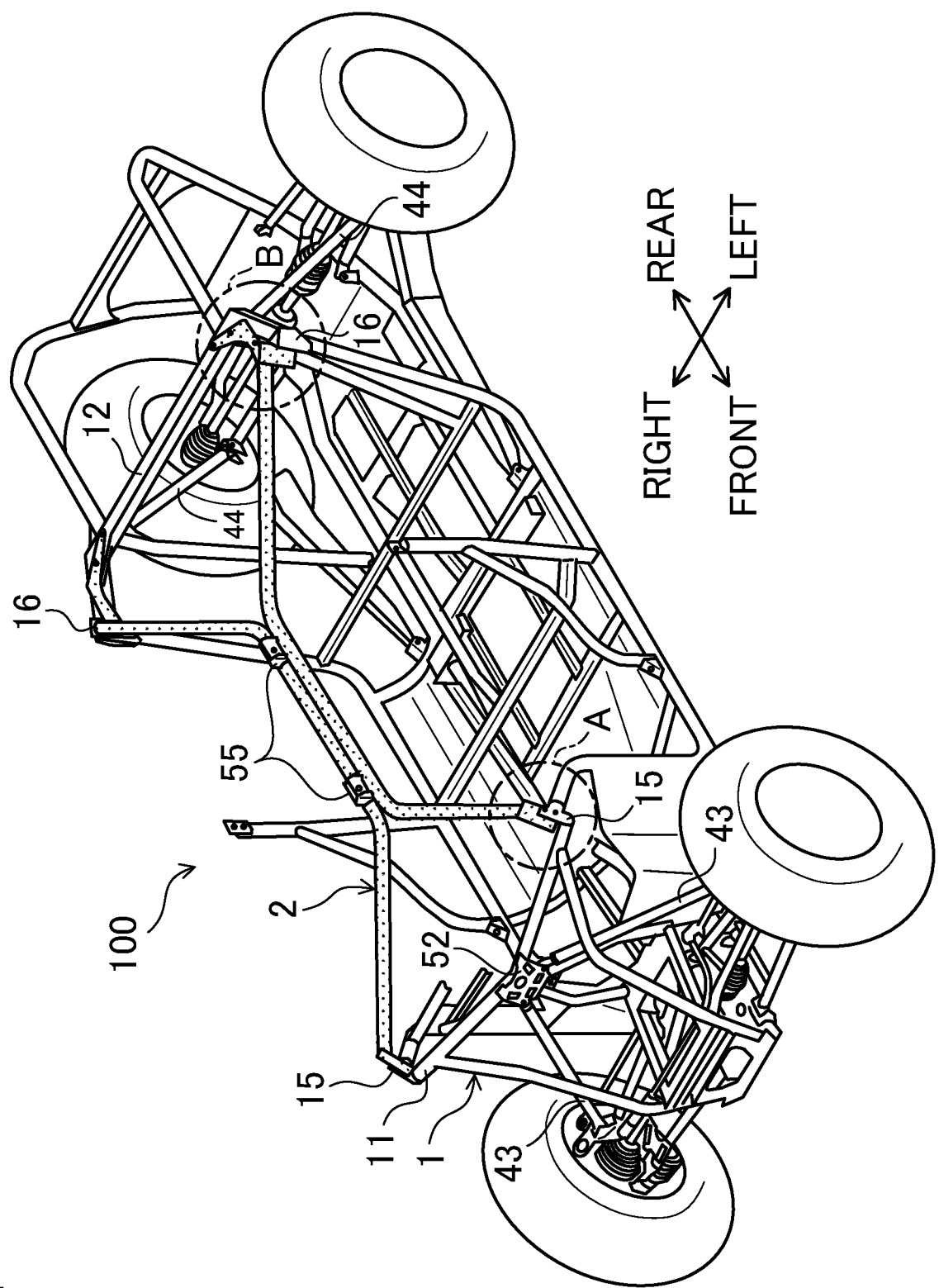
FIG. 1 is a perspective view of a partially disassembled utility vehicle.

An exemplary embodiment will be described in detail hereinafter with reference to the drawings. FIG. 1 is a perspective view of a partially disassembled utility vehicle 100. For convenience of description, FIG. 1 mainly shows a vehicle body frame 1 and does not show some parts other than the vehicle body frame 1. The utility vehicle 100 is a four-wheeled vehicle that can travel off-road. The utility vehicle 100 is an example of an off-road vehicle. Hereinafter, the utility vehicle 100 will also be referred to simply as a "vehicle 100."

In the present disclosure, configurations of the vehicle 100 will be described with reference to directions of the vehicle 100. Specifically, "front" refers to the front of the vehicle 100 in the vehicle front-rear direction, and "rear" refers to the rear of the vehicle 100 in the vehicle front-rear direction. "Left" refers to the left of the vehicle 100 when seeing forward, and "right" refers to the right of the vehicle 100 when seeing forward. The left-right direction will be sometimes referred to as a "vehicle width direction."

The vehicle 100 includes the vehicle body frame 1, and a reinforcing frame 2 that is detachably attached to the vehicle body frame 1. In FIG. 1, the reinforcing frame 2 is dotted for convenience of description.

Figure 2:
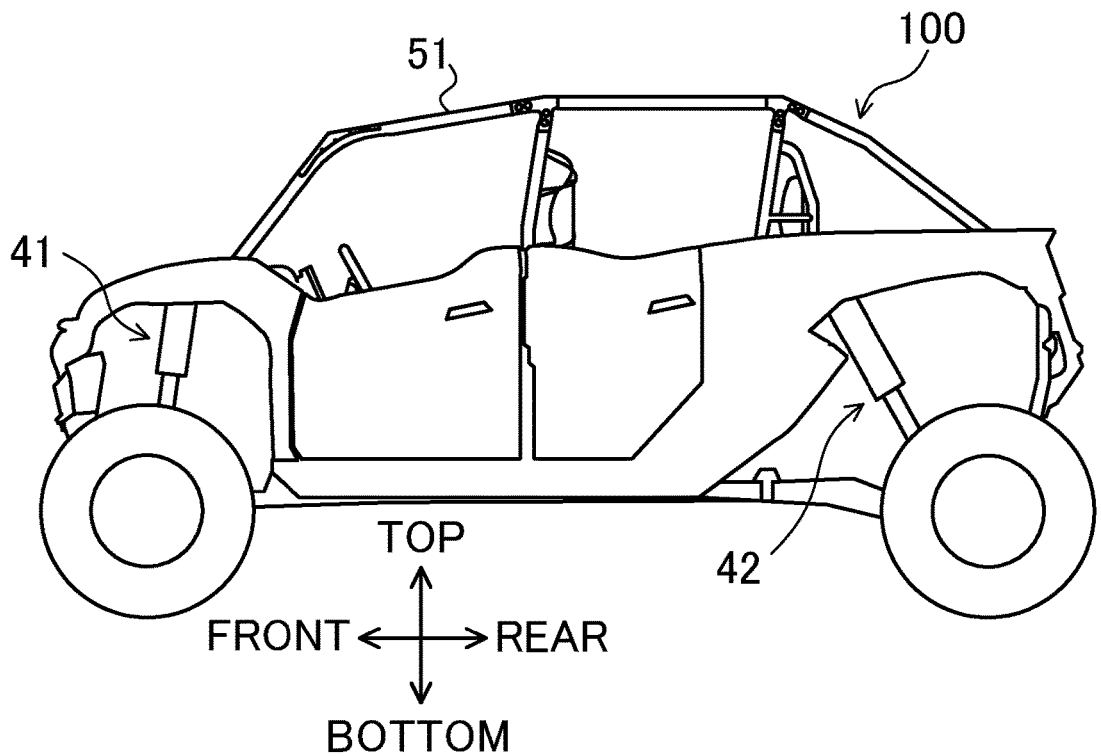
FIG. 2 is a left side view of the utility vehicle in use.
Figure 3:
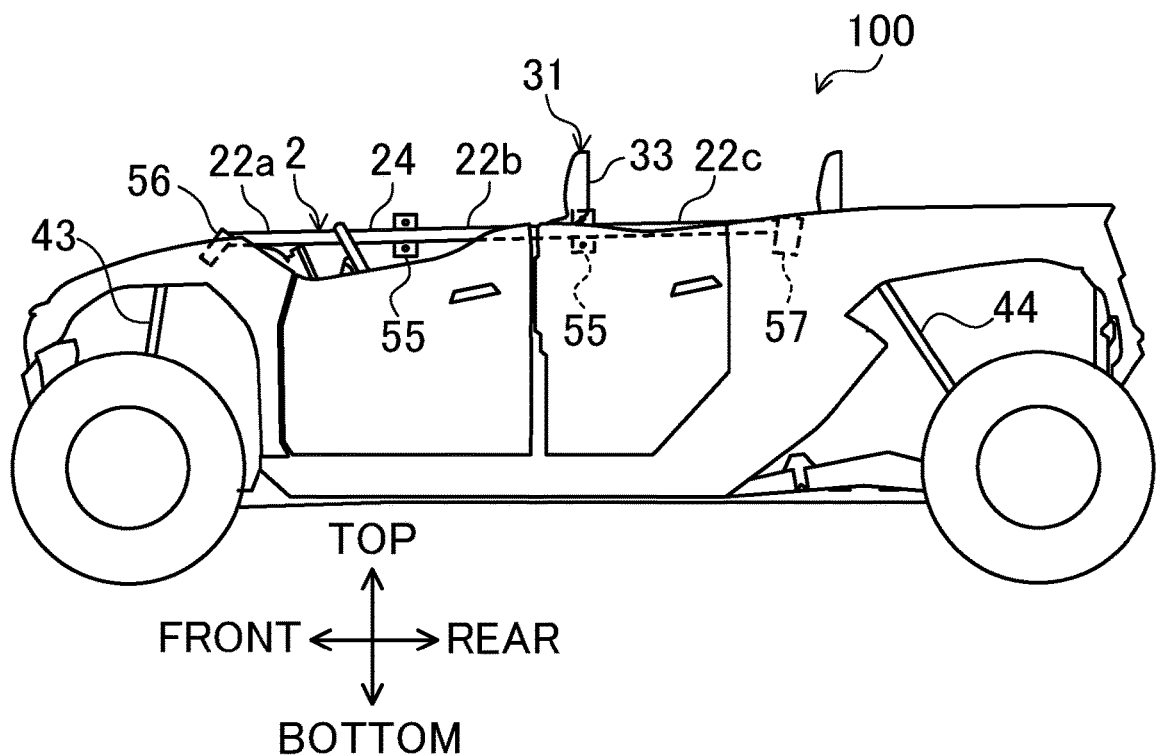
FIG. 3 is a left side view of the utility vehicle during transportation.

FIG. 2 is a left side view of the vehicle 100 in use. FIG. 3 is a left side view of the vehicle 100 during transportation. The vehicle 100 is alternately switched between a normal use state and a transportation state. The vehicle 100 in use is equipped with a ROPS 51. In the vehicle 100 during transportation, the ROPS 51 is detached and the reinforcing frame 2 is attached. The following description is directed to the vehicle 100 during transportation unless otherwise specified. FIG. 1 mentioned above shows the vehicle 100 during transportation.

Figure 4:
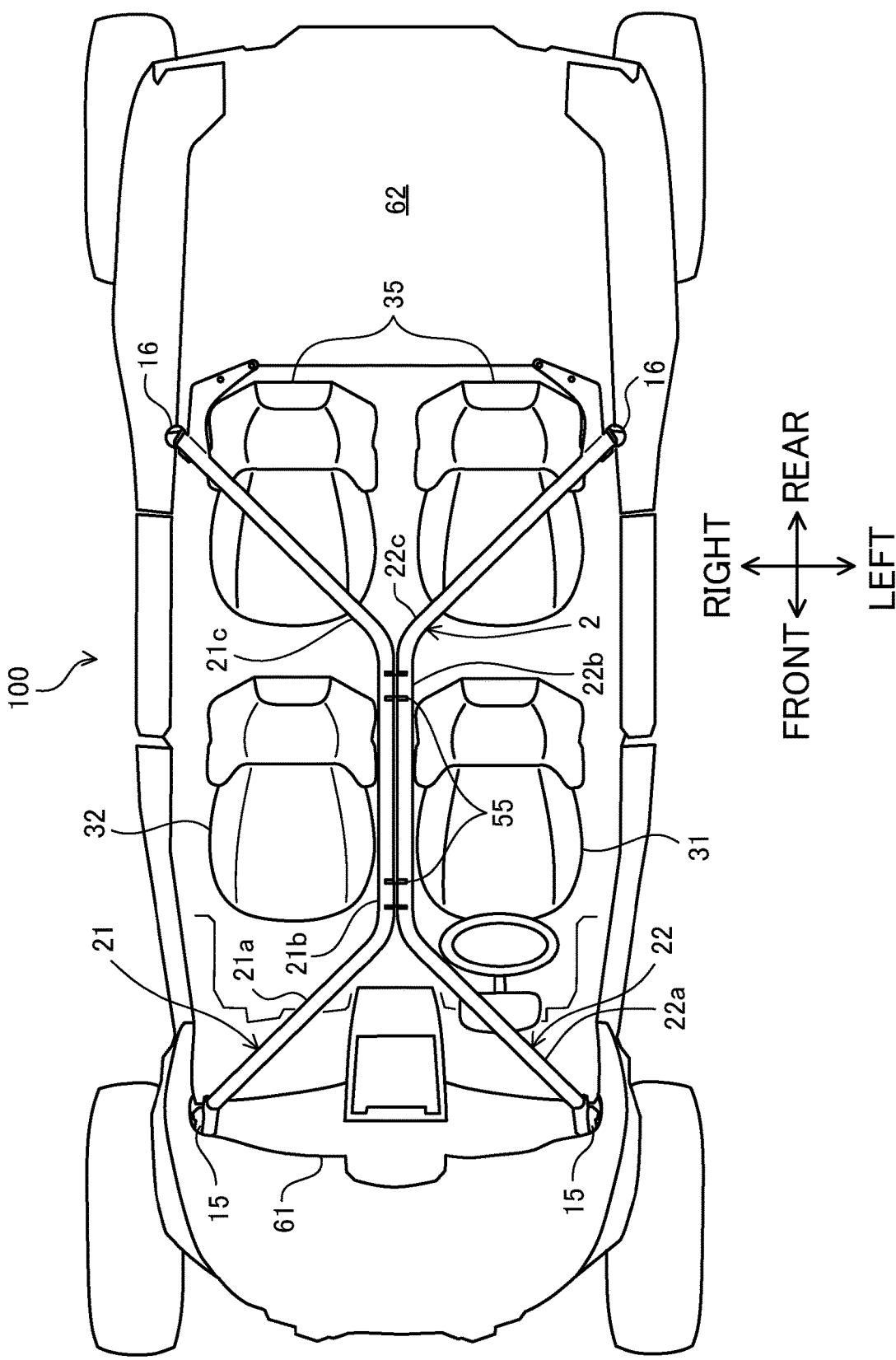
FIG. 4 is a plan view of the utility vehicle.

The vehicle body frame 1 is a part serving as a basic framework of the vehicle 100. The ROPS 51 is detachable from the vehicle body frame 1. As illustrated in FIGS. 1 and 4, the vehicle body frame 1 includes a first vehicle body frame 11 located forward of a driver's seat 31 and a second vehicle body frame 12 located rearward of the driver's seat 31. FIG. 4 is a plan view of the vehicle 100. In this example, each of the first vehicle body frame 11 and the second vehicle body frame 12 extends substantially in the vehicle width direction. The first vehicle body frame 11 is located below an instrument panel 61. When seen from the cabin, most part of the first vehicle body frame 11 is covered with the instrument panel 61. End portions of the first vehicle body frame 11 in the vehicle width direction are exposed from the instrument panel 61. The second vehicle body frame 12 is located rearward of a rear seat 35. When seen from the cabin, most part of the second vehicle body frame 12 is covered with a cabin panel 62 defining the cabin. End portions of the second vehicle body frame 12 in the vehicle width direction are exposed from the cabin panel 62.

Figure 5:
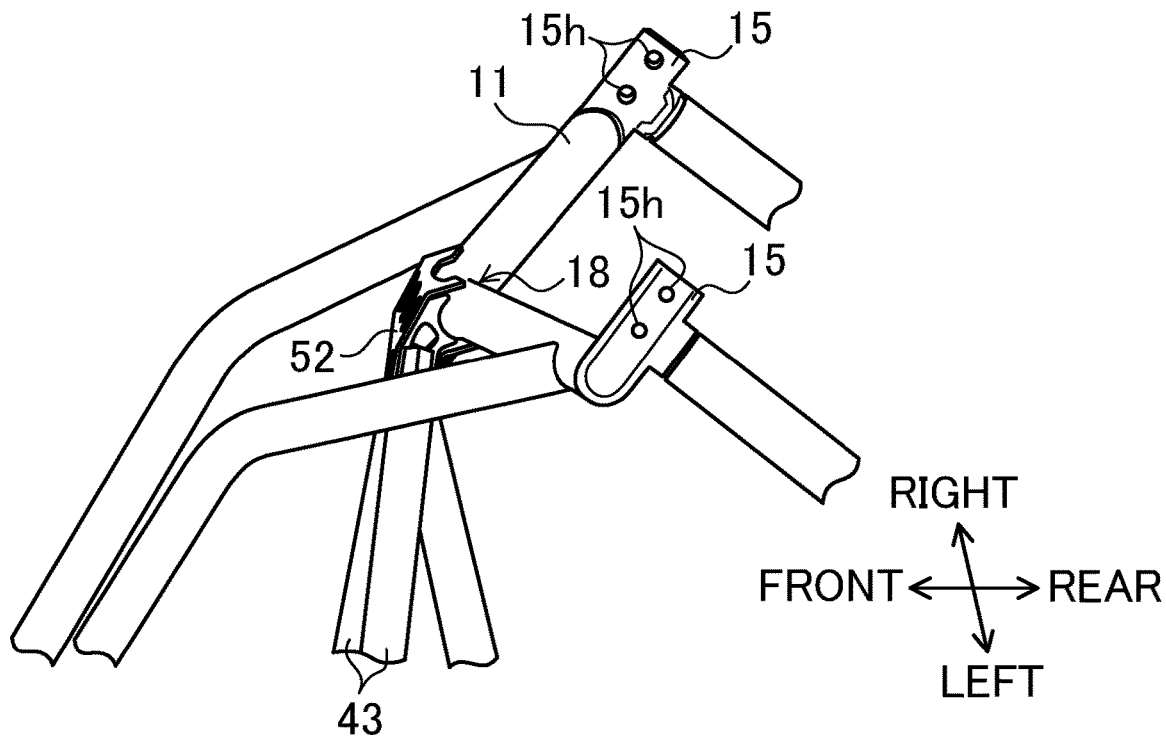
FIG. 5 is a perspective view of a first vehicle body frame and frames around the first vehicle body frame.

FIG. 5 is a perspective view of the first vehicle body frame 11 and frames around the first vehicle body frame 11 when seen obliquely from left above. The first vehicle body frame 11 is bent at a center in the vehicle width direction. Specifically, the first vehicle body frame 11 includes a bent portion 18 at a center thereof in the vehicle width direction. Accordingly, in the first vehicle body frame 11, a center portion in the vehicle width direction is located forward of both ends in the vehicle width direction.

The first vehicle body frame 11 is coupled to upper ends of front shock absorbers 41 (see FIG. 2) located forward of the driver's seat or upper ends of front alternative supporters 43 that are replaceable with the front shock absorbers 41. The term "coupling (coupled)" includes both direct coupling and indirect coupling. Specifically, a coupler 52 is attached to the first vehicle body frame 11. The coupler 52 is located substantially at a center of the first vehicle body frame 11 in the vehicle width direction, that is, at the bent portion 18. The upper ends of the front shock absorbers 41 are attached to the coupler 52. That is, the upper ends of the front shock absorbers 41 are coupled to the first vehicle body frame 11 through the coupler 52. Lower ends of the front shock absorbers 41 are attached to, for example, suspension arms.

The front shock absorbers 41 are replaceable with the front alternative supporters 43. In this example, the front shock absorbers 41 are replaced with the front alternative supporters 43. The front alternative supporters 43 are used instead of the front shock absorbers 41 in transportation of the vehicle 100. Each of the front alternative supporters 43 has a rod shape. For example, the overall length of the front alternative supporters 43 is shorter than the overall length of the front shock absorbers 41. Instead of the front shock absorbers 41, the front alternative supporters 43 are coupled to the first vehicle body frame 11 and, for example, the suspension arms. The upper ends of the front alternative supporters 43 are attached to the coupler 52. That is, the upper ends of the front alternative supporters 43 are coupled to the first vehicle body frame 11 through the coupler 52.

For example, in transportation of the vehicle 100, specifically, in a preparation stage of transportation, a user detaches the front shock absorbers 41 from the vehicle body frame 1 and attaches the front alternative supporters 43 to positions where the front shock absorbers 41 were attached. The use of the front alternative supporters 43 can reduce the vehicle height of the vehicle 100, as compared to the case of using the front shock absorbers 41.

Figure 6:
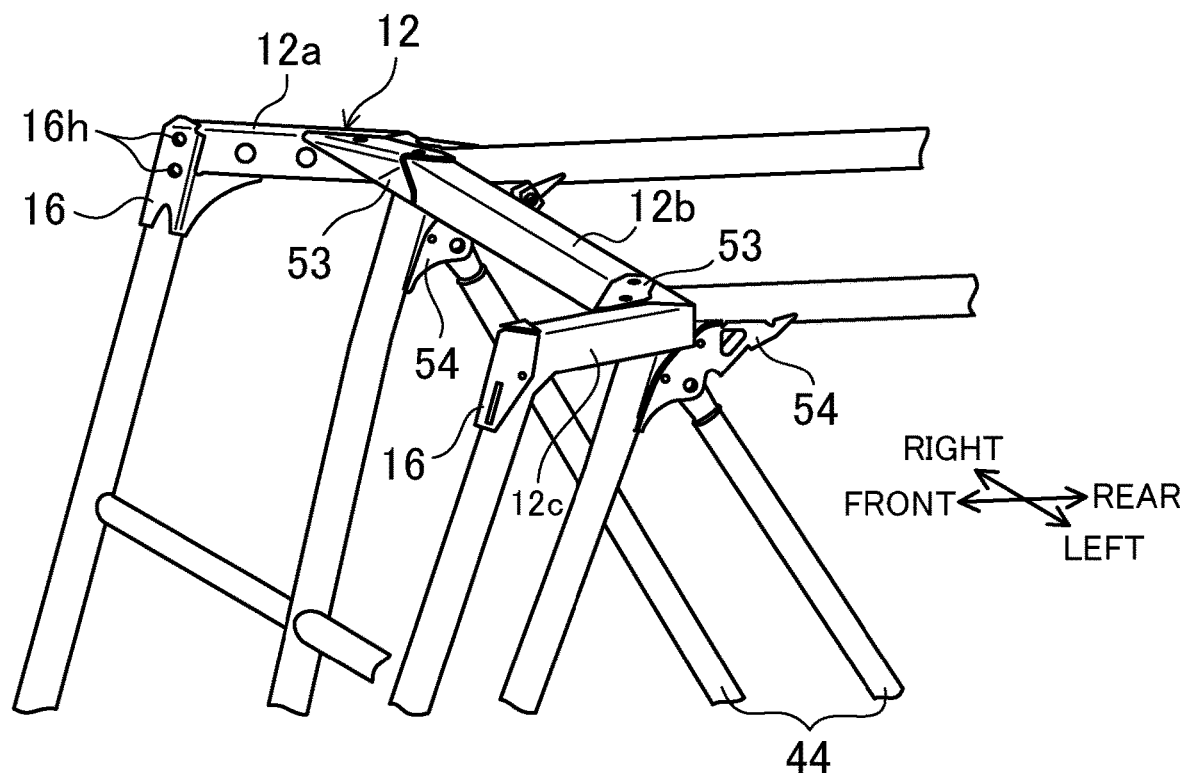
FIG. 6 is a perspective view of a second vehicle body frame and frames around the second vehicle body frame.

FIG. 6 is a perspective view of the second vehicle body frame 12 and frames around the second vehicle body frame 12 when seen obliquely from left above. The second vehicle body frame 12 includes a first end portion 12a, a body 12b, and a second end portion 12c. The first end portion 12a, the body 12b, and the second end portion 12c are coupled in this order through the coupler 53. The first end portion 12a, the body 12b, and the second end portion 12c are united. The body 12b extends substantially in the vehicle width direction. Each of the first end portion 12a and the second end portion 12c tilts with respect to the vehicle width direction. Specifically, each of the first end portion 12a and the second end portion 12c extends to approach the outside in the vehicle width direction toward the front. The body 12b is located rearward of a seat back of the rear seat 35 (see FIG. 4). The body 12b is covered with the cabin panel 62 (see FIG. 4). The first end portion 12a and the second end portion 12c are disposed along the sides of the seat back from the rear of the seat back of the rear seat 35. The first end portion 12a and the second end portion 12c are exposed from the cabin panel 62.

The second vehicle body frame 12 is coupled to upper ends of rear shock absorbers 42 (see FIG. 2) located rearward of the driver's seat or upper ends of rear alternative supporters 44 that are replaceable with the rear shock absorbers 42. In this example, the second vehicle body frame 12 is indirectly coupled to the upper ends of the rear alternative supporters 44. Specifically, the body 12b of the second vehicle body frame 12 is coupled to the upper ends of the rear alternative supporters 44 through a coupler 54. In a manner similar to the front alternative supporters 43, the rear alternative supporters 44 are used instead of the rear shock absorbers 42 in transportation of the vehicle 100. A basic configuration of the rear alternative supporters 44 is the same as that of the front alternative supporters 43, and thus, the rear alternative supporters 44 will not be described in detail.

As illustrated in FIG. 2, the vehicle 100 in use includes the ROPS 51. The ROPS 51 is a protection rod for protecting a passenger in case of turn-over of the vehicle or other accidents. The ROPS 51 is attached to the vehicle body frame 1 to surround space above the cabin. The ROPS 51 is detached in transportation of the vehicle 100.

As illustrated in FIGS. 5 and 6, attachments for attaching the ROPS 51 are attached to at least one of the first vehicle body frame 11 or the second vehicle body frame 12. In this example, first attachments 15 are attached to the first vehicle body frame 11, and second attachments 16 are attached to the second vehicle body frame 12. The ROPS 51 is, for example, bolted to the first attachments 15 and the second attachments 16.

More specifically, the first attachments 15 are respectively attached to ends of the first vehicle body frame 11 in the vehicle width direction. For example, each of the first attachments 15 has a plate shape. Each of the first attachments 15 has through holes 15h through which bolts or other members are inserted. The second attachments 16 are respectively attached to ends of the second vehicle body frame 12 in the vehicle width direction. Each of the second attachments 16 has a plate shape. Each of the second attachments 16 has through holes 16h through which bolts or other members are inserted. The ROPS 51 is attached to the first attachments 15 and the second attachments 16 with bolts. In this manner, the ROPS 51 is attached to the vehicle body frame 1. On the other hand, the ROPS 51 is detached from the first attachments 15 and the second attachments 16 by removing the bolts. In this manner, the ROPS 51 is detached from the vehicle body frame 1.

The reinforcing frame 2 is attached to the vehicle 100 instead of the ROPS 51 in transportation. The reinforcing frame 2 reinforces the vehicle body frame 1. As illustrated in FIG. 1, the reinforcing frame 2 couples the first vehicle body frame 11 and the second vehicle body frame 12 to each other. The reinforcing frame 2 extends in the front-rear direction as a whole between the first vehicle body frame 11 and the second vehicle body frame 12. A front end of the reinforcing frame 2 is attached to the first vehicle body frame 11, and a rear end of the reinforcing frame 2 is attached to the second vehicle body frame 12. The reinforcing frame 2 is, for example, a metal pipe.

The reinforcing frame 2 is attached to a portion of the first vehicle body frame 11 located outward of the driver's seat 31 or a passenger's seat 32 in the vehicle width direction. In addition, in this example, the reinforcing frame 2 is attached to a portion of the second vehicle body frame 12 located outward of the driver's seat 31 or the passenger's seat 32 in the vehicle width direction. That is, in this example, the reinforcing frame 2 extends across the cabin to be attached to end portions of the first vehicle body frame 11 in the vehicle width direction and end portions of the second vehicle body frame 12 in the vehicle width direction. Based on this premise, the reinforcing frame 2 is disposed not to interfere with the driver's seat 31 when seen in the top-bottom direction.

As illustrated in FIG. 4, the reinforcing frame 2 does not overlap with the driver's seat 31 when seen in the top-bottom direction. That is, the reinforcing frame 2 is shaped not to interfere with the driver's seat 31. The present disclosure, however, is not limited to this example, and a portion of the reinforcing frame 2 may overlap with a side portion of the driver's seat 31 when seen in the top-bottom direction. The reinforcing frame 2 passes between the driver's seat 31 and the passenger's seat 32. The "passenger's seat" herein refers not to a rear passenger's seat but to a passenger's seat adjacent to the driver's seat 31 in the vehicle width direction.

In this example, the reinforcing frame 2 includes a right reinforcing frame 21 located at the right and a left reinforcing frame 22 located at the left. Each of the right reinforcing frame 21 and the left reinforcing frame 22 extends in the front-rear direction as a whole. The shape of the right reinforcing frame 21 and the shape of the left reinforcing frame 22 are symmetric. The right reinforcing frame 21 and the left reinforcing frame 22 have the same structure except that left and right are reversed.

The right reinforcing frame 21 is bent such that an intermediate portion in the front-rear direction is located inward in the vehicle width direction of end portions in the front-rear direction. The left reinforcing frame 22 is also bent such that an intermediate portion in the front-rear direction is located inward in the vehicle width direction of end portions in the front-rear direction. The right reinforcing frame 21 and the left reinforcing frame 22 are disposed in an approximately X shape in plan view.

Specifically, the right reinforcing frame 21 includes a front frame 21a located at the front, a rear frame 21c located at the rear, and an intermediate frame 21b located between the front frame 21a and the rear frame 21c. The front frame 21a includes a front end of the right reinforcing frame 21. The rear frame 21c includes a rear end of the right reinforcing frame 21. The intermediate frame 21b extends substantially in the front-rear direction and passes between the driver's seat 31 and the passenger's seat 32. Each of the front frame 21a and the rear frame 21c tilts with respect to the front-rear direction. Specifically, the front frame 21a extends to approach the outside in the vehicle width direction toward the front. The rear frame 21c extends to approach the outside in the vehicle width direction as approaching toward the rear.

The left reinforcing frame 22 includes a front frame 22a located at the front, a rear frame 22c located at the rear, and an intermediate frame 22b located between the front frame 22a and the rear frame 22c. As described above, the left reinforcing frame 22 has a symmetric shape to the right reinforcing frame 21.

The front end of the right reinforcing frame 21 is attached to a right end of the first vehicle body frame 11 in the vehicle width direction. A front end of the left reinforcing frame 22 is attached to a left end of the first vehicle body frame 11 in the vehicle width direction. The rear end of the right reinforcing frame 21 is attached to a right end of the second vehicle body frame 12 in the vehicle width direction. A rear end of the left reinforcing frame 22 is attached to a left end of the second vehicle body frame 12 in the vehicle width direction.

Specifically, the reinforcing frame 2 is attached to the first attachments 15 and the second attachments 16 instead of the ROPS 51. As described above, the first attachments 15 are disposed to the ends of the first vehicle body frame 11 in the vehicle width direction. A front end of the front frame 21a of the right reinforcing frame 21 is attached to the right first attachment 15. A front end of the front frame 22a of the left reinforcing frame 22 is attached to the left first attachment 15. The first attachments 15 are exposed from the instrument panel 61. Each of the right reinforcing frame 21 and the left reinforcing frame 22 extends from the first attachments 15 not to interfere with the instrument panel 61. The second attachments 16 are exposed from the cabin panel 62. Each of the right reinforcing frame 21 and the left reinforcing frame 22 extends from the second attachments 16 not to interfere with the cabin panel 62.

Figure 7:
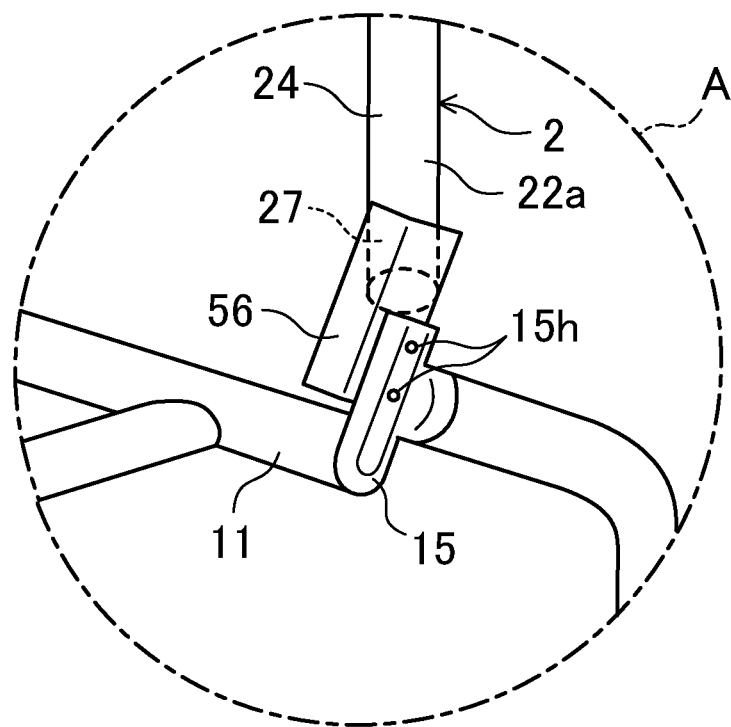
FIG. 7 is an enlarged view of a portion A in FIG. 1.

Fixing of the reinforcing frame 2 will now be described in detail using the left reinforcing frame 22 as an example. Fixing of the right reinforcing frame 21 is the same as fixing of the left reinforcing frame 22. FIG. 7 is an enlarged view of a portion A in FIG. 1. The front frame 22a of the left reinforcing frame 22 is attached to the first attachment 15. The front frame 22a has a plate-shaped fixture 56. The fixture 56 is bolted to the first attachment 15. In this manner, the left reinforcing frame 22 is attached to the first attachment 15 through the fixture 56. FIG. 7 does not show bolts or the like.

Figure 8:
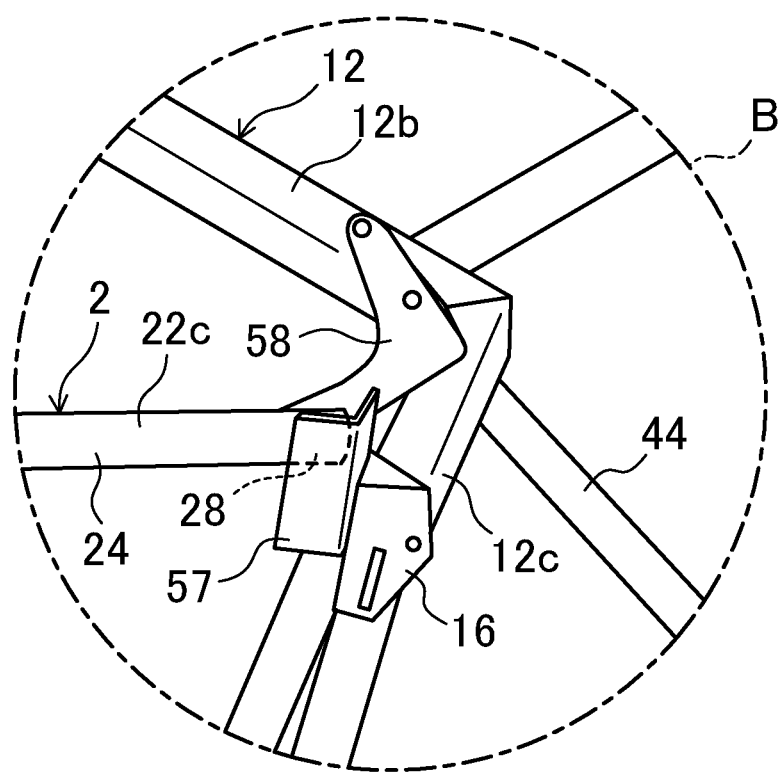
FIG. 8 is an enlarged view of a portion B in FIG. 1.

FIG. 8 is an enlarged view of a portion B in FIG. 1. The rear frame 22c of the left reinforcing frame 22 is attached to the second attachment 16. The rear frame 22c has a plate-shaped fixture 57. The fixture 57 is bolted to the second attachment 16. In this manner, the left reinforcing frame 22 is attached to the second attachment 16 through the fixture 57. FIG. 8 does not show bolts or the like.

In this example, the reinforcing frame 2 further includes a fixture 58. The fixture 58 has a substantially boomerang shape with two arms. One of the arms of the fixture 58 is attached to a rearward end 28 in a portion of the reinforcing frame 2 except for the fixture 58 by welding or other processes. The other arm of the fixture 58 is, for example, bolted to the second vehicle body frame 12.

As illustrated in FIG. 3, at least a portion of the reinforcing frame 2 corresponding to the driver's seat 31 passes substantially at the same level as a headrest 33, preferably, passes below an upper end of the headrest 33. Specifically, the intermediate frame 21b of the right reinforcing frame 21 and the intermediate frame 22b of the left reinforcing frame 22 are located substantially at the same position as the position of the driver's seat 31 in the front-rear direction, as illustrated in FIG. 2. The intermediate frame 21b and the intermediate frame 22b pass below the upper end of the headrest 33 of the driver's seat 31. In this example, the entire right and left reinforcing frames 21 and 22 pass below the upper end of the headrest 33 of the driver's seat 31. The height of the reinforcing frame 2 is approximately equal to the height of the first vehicle body frame 11 and the second vehicle body frame 12. Specifically, as illustrated in FIGS. 3, 7, and 8, the reinforcing frame 2 includes a rod body 24, and attachments that are located at the ends of the rod body 24 and coupled to the vehicle body frame 1. The fixture 56 and the fixture 57 described above are examples of the attachments. The rod body 24 extends in the front-rear direction when seen in the vehicle width direction. More specifically, the rod body 24 is bent with respect to the attachments. In this manner, the reinforcing frame 2 can be easily attached to the vehicle body frame 1.

The right reinforcing frame 21 and the left reinforcing frame 22 are coupled to each other through a coupler 55. In this manner, the right reinforcing frame 21 and the left reinforcing frame 22 are united. Specifically, the intermediate frame 21b and the intermediate frame 22b are coupled to each other through the coupler 55. In this manner, the reinforcing frame 2 is a combination of segments that can be separated. The right reinforcing frame 21 and the left reinforcing frame 22 are examples of the segments.

Figure 9:
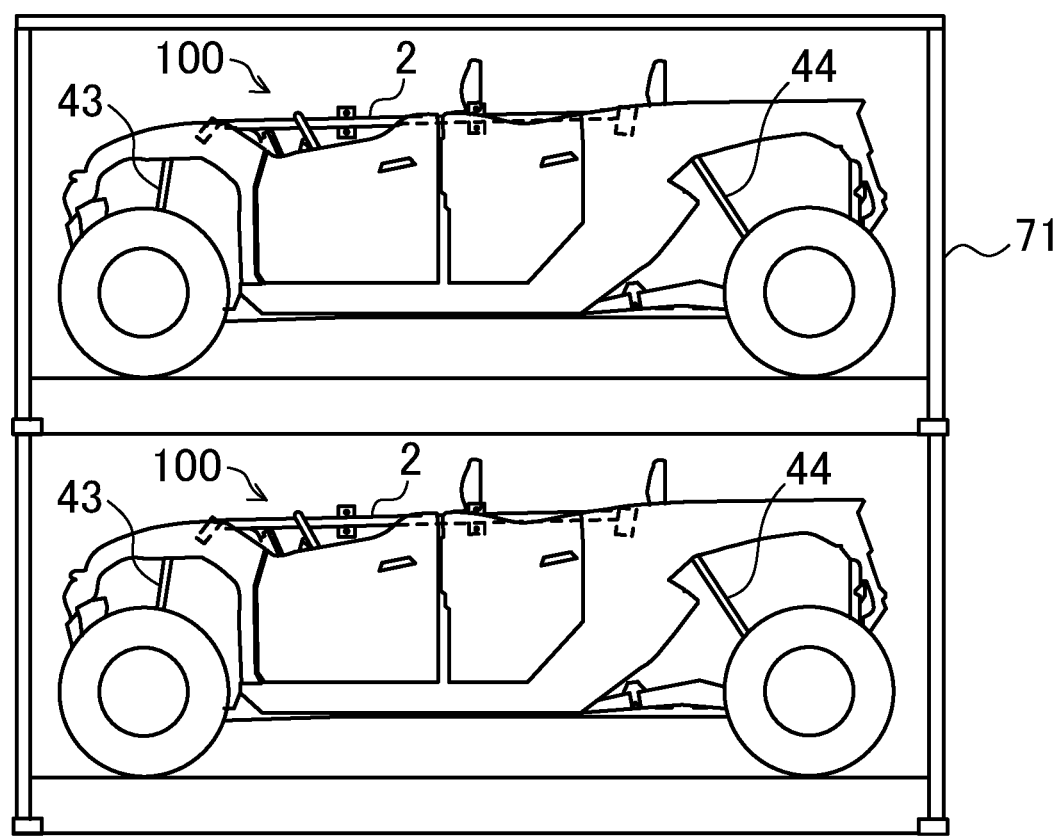
FIG. 9 is an illustration for describing an example of a method for transporting a utility vehicle.

Next, an example of a method for transporting the vehicle 100 will be described. FIG. 9 is an illustration for describing an example of the method for transporting the vehicle 100.

The method for transporting the vehicle 100 includes: attaching the reinforcing frame 2 to the vehicle body frame 1 before transportation of the vehicle 100, the reinforcing frame 2 replacing the ROPS 51 and coupling the first vehicle body frame 11 and the second vehicle body frame 12 to each other, the first vehicle body frame 11 being located forward of the driver's seat of the vehicle 100, the second vehicle body frame 12 being located rearward of the driver's seat; transporting the vehicle 100 to which the reinforcing frame 2 is attached; and detaching the reinforcing frame 2 from the vehicle body frame 1 and attaching the ROPS 51 to the vehicle body frame 1 after transportation of the vehicle 100. In this example, the ROPS 51 is not attached to the vehicle 100 before transportation.

In a case where the ROPS 51 is attached to the vehicle 100 before transportation, the method may further include detaching the ROPS 51 from the vehicle body frame 1 of the vehicle 100 before transportation of the vehicle 100. That is, in this case, the method for transporting the vehicle 100 may include: detaching the ROPS 51 from the vehicle body frame 1 of the vehicle 100; and attaching the reinforcing frame 2 to the vehicle body frame 1, the reinforcing frame 2 operable to couple the first vehicle body frame 11 and the second vehicle body frame 12 to each other, the first vehicle body frame 11 being located forward of the driver's seat of the vehicle 100, the second vehicle body frame 12 being located rearward of the driver's seat.

The method for transporting the vehicle 100 may further include loading a carrier 71 (see FIG. 9) with the vehicles 100 such that the vehicles 100 to each of which the reinforcing frame 2 is attached are arranged in the top-bottom direction, and transporting the carrier 71. In loading the carrier 71 with the vehicles 100, the carrier 71 may be loaded with the vehicles 100 in a state where the reinforcing frame 2 is attached to each of the vehicles 100 and the vehicles 100 are ready to run on their own. The method for transporting the vehicle 100 may further include replacing the front shock absorbers 41 and the rear shock absorbers 42 attached to the vehicle body frame 1 with the front alternative supporters 43 and the rear alternative supporters 44, respectively. Preferably, the front alternative supporters 43 have an overall length shorter than the front shock absorbers 41. Preferably, the rear alternative supporters 44 have an overall length shorter than the rear shock absorbers 42.

Specifically, as illustrated in FIGS. 1, 3, 7, and 8, before transportation of the vehicle 100, the reinforcing frame 2 is attached to the vehicle 100. As described above, the reinforcing frame 2 is attached to each of the first vehicle body frame 11 and the second vehicle body frame 12. Specifically, the reinforcing frame 2 is attached to the first attachments 15 and the second attachments 16 for attaching the ROPS 51. The right reinforcing frame 21 and the left reinforcing frame 22 are coupled to each other through the coupler 55. The right reinforcing frame 21 and the left reinforcing frame 22 may be coupled to each other through the coupler 55 before being attached to the vehicle body frame 1.

The front shock absorbers 41 and the rear shock absorbers 42 are replaced with the front alternative supporters 43 and the rear alternative supporters 44, respectively. Accordingly, the vehicle height of the vehicle 100 can be reduced. Instead of replacing the front alternative supporters 43 and the rear alternative supporters 44, the front shock absorbers 41 and the rear shock absorbers 42 may be compressed to reduce the vehicle height of the vehicle 100.

After the reinforcing frame 2 is attached to the vehicle 100, bundled parts such as the disassembled ROPS 51 may be attached to the reinforcing frame 2.

In this manner, the carrier 71 is loaded with the vehicles 100 to each of which the reinforcing frame 2 is attached, as illustrated in FIG. 9. In this case, the carrier 71 houses the vehicles 100 stacked in two levels. At this time, a driver may drive the vehicle 100 to place the vehicle 100 on the carrier 71. The carrier 71 is transported by, for example, a truck. In this manner, the vehicles 100 are transported.

In the vehicle 100 configured as described above, the reinforcing frame 2 is attached to the vehicle body frame 1, instead of the ROPS 51. The vehicle body frame 1 might be deformed under a load caused by vibrations during transportation. The reinforcing frame 2 reduces such deformation of the vehicle body frame 1. Consequently, it is possible to make the vehicle 100 compact while reducing deformation of the vehicle body frame 1 during transportation. Accordingly, a large number of vehicles 100 can be transported at a time, and thus, the vehicles 100 can be efficiently transported.

In addition, the reinforcing frame 2 substantially does not overlap with the driver's seat 31 when seen in the top-bottom direction. Since the reinforcing frame 2 does not hinder the driver, the driver can drive the vehicle 100 to which the reinforcing frame 2 is attached. For example, the driver can easily move the vehicle 100 to the carrier 71.

Furthermore, the reinforcing frame 2 passes between the driver's seat 31 and the passenger's seat 32. The configuration in which the reinforcing frame 2 does not overlap with the driver's seat 31 when seen in the top-bottom direction can be a configuration in which the reinforcing frame 2 passes at the outer side of the driver's seat 31 in the vehicle width direction. In this example, the reinforcing frame 2 passes at the inner side of the driver's seat 31 in the vehicle width direction so that the reinforcing frame 2 does not extend across entrances of the vehicle 100. Accordingly, even in the case where the reinforcing frame 2 is attached to the vehicle 100, the driver can easily get into the vehicle 100.

At least a portion of the reinforcing frame 2 corresponding to the driver's seat 31 passes below than the upper end of the headrest 33. Accordingly, the height of the vehicle 100 to which the reinforcing frame 2 is attached can be reduced. As a result, accommodation efficiency of the vehicles 100 during transportation can be enhanced. For example, as described above, the two-level stacking of the vehicles 100 on the carrier 71 can be easily achieved. In addition, the height of the reinforcing frame 2 can be made close to the height of the first vehicle body frame 11 and the second vehicle body frame 12. Accordingly, a larger component affects the reinforcing frame 2 in the longitudinal direction in a load affecting on the reinforcing frame 2 from the first vehicle body frame 11 or the second vehicle body frame 12. Rigidity of the reinforcing frame 2 in the longitudinal direction is higher than flexural rigidity of the reinforcing frame 2. Thus, the reinforcing frame 2 can more effectively receive a load from the vehicle body frame 1.

In addition, the height of the vehicle 100 can be further reduced by replacing the front shock absorbers 41 and the rear shock absorbers 42 with the relatively short front alternative supporters 43 and the relatively short rear alternative supporters 44, respectively.

The first attachments 15 to which the ROPS 51 is to be attached are attached to the first vehicle body frame 11. The second attachments 16 to which the ROPS 51 is to be attached are attached to the second vehicle body frame 12. The reinforcing frame 2 is attached to the first attachments 15 and the second attachments 16. Accordingly, it is unnecessary to prepare new attachments for attaching the reinforcing frame 2 to the vehicle 100.

The reinforcing frame 2 is attached to a portion of the first vehicle body frame 11 located outward of the driver's seat 31 and the passenger's seat 32 in the vehicle width direction. Accordingly, the reinforcing frame 2 can be disposed without interference with members located near a center portion of the first vehicle body frame 11. For example, the reinforcing frame 2 can be disposed without interference with the instrument panel 61 located near the center portion of the first vehicle body frame 11. Further, the reinforcing frame 2 is attached to a portion of the second vehicle body frame 12 located outward of the driver's seat 31 and the passenger's seat 32 in the vehicle width direction. Accordingly, the reinforcing frame 2 can be disposed without interference with members located near a center portion of the second vehicle body frame 12.

The first vehicle body frame 11 is coupled to the upper ends of the front shock absorbers 41 or the upper ends of the front alternative supporters 43. Accordingly, a load on the vehicle body frame 1 can be effectively reduced. Specifically, the front shock absorbers 41 or the front alternative supporters 43 are attached to, for example, the suspension arms coupled to front wheels. The first vehicle body frame 11 is coupled to the upper ends of the front shock absorbers 41 or the upper ends of the front alternative supporters 43. Accordingly, vibrations during transportation of the vehicle 100 are easily transferred to the first vehicle body frame 11 through the front shock absorbers 41 or the front alternative supporters 43 and the front wheels. The reinforcing frame 2 can reduce deformation of the vehicle body frame 1 caused by the vibrations.

The second vehicle body frame 12 is coupled to the upper ends of the rear shock absorbers 42 or the upper ends of the rear alternative supporters 44, located rearward of the driver's seat 31. Accordingly, a load on the vehicle body frame 1 can be effectively reduced. Specifically, the rear shock absorbers 42 or the rear alternative supporters 44 are attached to, for example, suspension arms coupled to rear wheels. The second vehicle body frame 12 is coupled to the upper ends of the rear shock absorbers 42 or the upper ends of the rear alternative supporters 44. Accordingly, vibrations during transportation of the vehicle 100 are easily transferred to the second vehicle body frame 12 through the rear shock absorbers 42 or the rear alternative supporters 44 and the rear wheels. The reinforcing frame 2 can reduce deformation of the vehicle body frame 1 caused by the vibrations.

OTHER EMBODIMENTS

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the off-road vehicle is not limited to the utility vehicle 100. The off-road vehicle may be, for example, an all terrain vehicle (ATV), a tractor, or other vehicles. The off-road vehicle is not limited to the four-wheeled vehicle, and may be a three-wheeled vehicle, for example.

The first vehicle body frame 11 is not limited to the vehicle body frame located below the instrument panel 61 as long as the vehicle body frame is located forward of the driver's seat 31. The second vehicle body frame 12 is not limited to the vehicle body frame located rearward of the rear seat 35 as long as the vehicle body frame is located rearward of the driver's seat 31.

The shape of the reinforcing frame 2 is not limited as long as the reinforcing frame 2 can couple the first vehicle body frame 11 and the second vehicle body frame 12 to each other. For example, the reinforcing frame 2 may extend linearly in the front-rear direction when seen in the top-bottom direction. In this case, the reinforcing frame 2 preferably passes between the driver's seat 31 and the passenger's seat 32. For example, the reinforcing frame 2 may be a combination of a frame coupling a right end of the first vehicle body frame 11 and a left end of the second vehicle body frame 12 to each other and a frame coupling a left end of the first vehicle body frame 11 and a right end of the second vehicle body frame 12 to each other. In other words, the right reinforcing frame 21 may extend from front left to rear right, and the left reinforcing frame 22 may extend from front right to rear left. For example, the reinforcing frame 2 may be curved upward or downward when seen in the vehicle width direction. The reinforcing frame 2 may have a Y shape or a T shape when seen in the top-bottom direction.

The reinforcing frame 2 may be attached to a portion of the first vehicle body frame 11 other than end portions thereof in the vehicle width direction. For example, in a case where the reinforcing frame 2 extends linearly in the front-rear direction when seen in the top-bottom direction, the reinforcing frame 2 may be attached to a center portion of the first vehicle body frame 11 in the vehicle width direction. Similarly, the reinforcing frame 2 may be attached to a portion of the second vehicle body frame 12 other than end portions thereof in the vehicle width direction.

The reinforcing frame 2 may not pass between the driver's seat 31 and the passenger's seat 32. For example, the right reinforcing frame 21 may pass at the right of the passenger's seat 32, and the left reinforcing frame 22 may pass at the left of the driver's seat 31. At least a portion of the reinforcing frame 2 corresponding to the driver's seat 31 may pass above the upper end of the headrest 33. Even in this case, the vehicle height of the vehicle 100 during transportation is preferably lower than the vehicle height of the vehicle 100 in use. Accordingly, accommodation efficiency of the vehicle 100 during transportation can be enhanced.

The reinforcing frame 2 may not be attached to the first attachments 15 and the second attachments 16. For example, an additional fixture may be attached to the vehicle body frame 1 such that the reinforcing frame 2 is attached to this fixture.

The reinforcing frame 2 may not include the right reinforcing frame 21 and the left reinforcing frame 22. The reinforcing frame 2 may be one frame or a combination of three or more frames. The right reinforcing frame 21 and the left reinforcing frame 22 may not be coupled to each other through the coupler 55. The right reinforcing frame 21 and the left reinforcing frame 22 may be coupled together as one unit by welding or other processes without using the coupler 55. The reinforcing frame may not include any of the fixture 56, the fixture 57, and the fixture 58.

The reinforcing frame 2 may be attached to the vehicle body frame 1 during storage of the vehicle 100, i.e., during a preparation stage of transportation.

Before transportation of the vehicle 100, the headrest may be detached from the vehicle 100. Before transportation of the vehicle 100, wheels of the vehicle 100 may be replaced with wheels having relatively small diameters. In such cases, the height of the vehicle 100 can be further reduced.

The techniques of the present disclosure described above are summarized as follows.

[1] A utility vehicle 100 (off-road vehicle) includes: a vehicle body frame 1 to which a ROPS is detachably attachable; and a reinforcing frame 2 that is detachably attachable to the vehicle body frame 1 instead of the ROPS, the vehicle body frame 1 includes a first vehicle body frame 11 located forward of a driver's seat 31 and a second vehicle body frame 12 located rearward of the driver's seat 31, and the reinforcing frame 2 couples the first vehicle body frame 11 and the second vehicle body frame 12 to each other.

In this configuration, the reinforcing frame 2 is attached to the vehicle body frame 1, instead of the ROPS 51. The reinforcing frame 2 reduces deformation of the vehicle body frame 1 during transportation of the utility vehicle 100. Consequently, it is possible to make the utility vehicle 100 compact while reducing deformation of the vehicle body frame 1 during transportation. Accordingly, a large number of vehicles 100 can be transported at a time, and thus, the vehicles 100 can be efficiently transported.

[2] In the utility vehicle 100 of [1], the reinforcing frame 2 substantially does not overlap with the driver's seat 31 when seen in a top-bottom direction.

In this configuration, a driver can drive the utility vehicle 100 to which the reinforcing frame 2 is attached.

[3] In the utility vehicle 100 of [1] or [2], the reinforcing frame 2 passes between the driver's seat 31 and a passenger's seat 32.

In this configuration, even in a case where the reinforcing frame 2 is attached to the utility vehicle 100, the driver can easily get into the utility vehicle 100 and drive the utility vehicle 100.

[4] In the utility vehicle 100 of any one of [1] to [3], at least a portion of the reinforcing frame 2 corresponding to the driver's seat 31 passes below an upper end of a headrest 33.

In this configuration, the height of the utility vehicle 100 to which the reinforcing frame 2 is attached can be reduced.

[5] In the utility vehicle 100 of any one of [1] to [4], an attachment 15, 16 to which the ROPS 51 is attached is attached to at least one of the first vehicle body frame 11 or the second vehicle body frame 12, and the reinforcing frame 2 is attached to the attachment 15, 16.

In this configuration, it is unnecessary to prepare new attachments for attaching the reinforcing frame 2 to the utility vehicle 100.

[6] In the utility vehicle 100 of any one of [1] to [5], each of the first vehicle body frame 11 and the second vehicle body frame 12 extends substantially in a vehicle width direction, and the reinforcing frame 2 is attached to a portion of the first vehicle body frame 11 located outward of the driver's seat 31 or a passenger's seat 32 in a vehicle width direction.

In this configuration, the reinforcing frame 2 can be disposed without interference with members located near a center portion of the first vehicle body frame 11.

[7] In the utility vehicle 100 of any one of [1] to [6], the first vehicle body frame 11 is coupled to an upper end of a front shock absorber 41 located forward of the driver's seat 31 or an upper end of a front alternative supporter 43 that is replaceable with the front shock absorber 41.

In this configuration, a load on the vehicle body frame 1 can be effectively reduced.

[8] In the utility vehicle 100 of any one of [1] to [7], the second vehicle body frame 12 is coupled to an upper end of a rear shock absorber 42 located rearward of the driver's seat 31 or an upper end of a rear alternative supporter 44 that is replaceable with the rear shock absorber 42.

In this configuration, a load on the vehicle body frame 1 can be effectively reduced.

[9] In the utility vehicle 100 of any one of [1] to [8], the reinforcing frame 2 includes a rod body 24, and attachments (i.e., a fixture 56 and a fixture 57) that are located at ends of the rod body 24 and coupled to the vehicle body frame 1, and the rod body 24 extends in a front-rear direction when seen in a vehicle width direction.

In this configuration, the height of the utility vehicle 100 to which the reinforcing frame 2 is attached can be reduced.

[10] In the utility vehicle 100 of any one of [1] to [9], the reinforcing frame 2 is a combination of segments that are separatable.

In this configuration, the reinforcing frame 2 can be divided for storage. Accordingly, the size of storage space for the reinforcing frame 2 can be reduced, as compared to a case where the reinforcing frame 2 cannot be divided.

[11] A reinforcing frame 2 that is attached to a utility vehicle 100 during transportation, is detachably attachable to a utility vehicle body frame 1 of the utility vehicle 100 instead of a ROPS, and operable to couple a first vehicle body frame 11 and a second vehicle body frame 12 to each other, the first vehicle body frame 11 is located forward of a driver's seat 31 of the utility vehicle 100, and the second vehicle body frame 12 is located rearward of the driver's seat 31.

In this configuration, the utility vehicle 100 can be efficiently transported.

[12] A method for transporting a utility vehicle 100 is a method for transporting a utility vehicle 100 including a vehicle body frame 1 to which a ROPS 51 is detachably attachable, and includes: attaching a reinforcing frame 2 replacing the ROPS 51 to the vehicle body frame 1 before transportation of the utility vehicle 100, the reinforcing frame 2 being operable to couple a first vehicle body frame 11 and a second vehicle body frame 12 of the vehicle body frame 1 to each other, the first vehicle body frame 11 being located forward of a driver's seat 31, the second vehicle body frame 12 being located rearward of the driver's seat 31; transporting the utility vehicle 100 to which the reinforcing frame 2 is attached; and detaching the reinforcing frame 2 from the vehicle body frame 1 and attaching the ROPS 51 to the vehicle body frame 1 after transportation of the utility vehicle 100.

In this configuration, in the utility vehicle 100 before transportation, since the reinforcing frame 2 replacing the ROPS 51 is attached to the vehicle body frame 1, the utility vehicle 100 can be made more compact than in a case where the ROPS 51 is attached to the vehicle body frame 1. Since the reinforcing frame 2 is attached to the vehicle body frame 1, deformation of the vehicle body frame 1 can be reduced during transportation of the utility vehicle 100.

[13] The method for transporting the utility vehicle 100 of [12] further includes: loading a carrier 71 with utility vehicles 100 to each of which the reinforcing frame 2 is attached such that the utility vehicles 100 are arranged in a top-bottom direction, and the carrier 71 is transported in transportation of the utility vehicles 100.

In this configuration, loading capacity of the utility vehicle 100 can be increased.

[14] The method for transporting the utility vehicle 100 of [13], in loading the carrier 71 with the utility vehicles 100, the carrier 71 is loaded with the utility vehicles 100 in a state where the reinforcing frame 2 is attached to each of the utility vehicles 100 and the utility vehicles 100 are ready to run on their own.

In this configuration, the carrier 71 can be loaded with the utility vehicle 100 without using a forklift or other equipment.

[15] The method for transporting the utility vehicle 100 of [12] further includes: replacing a shock absorber 41, 42 attached to the vehicle body frame 1 with an alternative supporter 43, 44 having an overall length shorter than that of the shock absorber 41, 42.

In this configuration, the height of the utility vehicle 100 can be reduced.

What is claimed is:

1. An off-road vehicle comprising:
a vehicle body frame to which a roll-over protection structure (ROPS) is detachably attachable; and
a reinforcing frame that is replaceable with the ROPS and is detachably attachable to the vehicle body frame, wherein
the vehicle body frame includes a first vehicle body frame and a second vehicle body frame, the first vehicle body frame being located forward of a driver's seat, the second vehicle body frame being located rearward of the driver's seat, and
the reinforcing frame couples the first vehicle body frame and the second vehicle body frame to each other.

2. The off-road vehicle according to claim 1, wherein the reinforcing frame substantially does not overlap with the driver's seat when seen in a top-bottom direction.

3. The off-road vehicle according to claim 1, wherein the reinforcing frame passes between the driver's seat and a passenger's seat.

4. The off-road vehicle according to claim 1, wherein at least a portion of the reinforcing frame corresponding to the driver's seat passes below an upper end of a headrest.

5. The off-road vehicle according to claim 1, wherein an attachment to which the ROPS is to be attached is attached to at least one of the first vehicle body frame or the second vehicle body frame, and
the reinforcing frame is attached to the attachment.

6. The off-road vehicle according to claim 1, wherein each of the first vehicle body frame and the second vehicle body frame extends substantially in a vehicle width direction, and
the reinforcing frame is attached to a portion of the first vehicle body frame located outward of the driver's seat or a passenger's seat in a vehicle width direction.

7. The off-road vehicle according to claim 1, wherein the first vehicle body frame is coupled to an upper end of a front shock absorber or an upper end of a front alternative supporter that is replaceable with the front shock absorber.

8. The off-road vehicle according to claim 1, wherein the second vehicle body frame is coupled to an upper end of a rear shock absorber or an upper end of a rear alternative supporter that is replaceable with the rear shock absorber.

9. The off-road vehicle according to claim 1, wherein the reinforcing frame includes a rod body, and attachments that are located at ends of the rod body and coupled to the vehicle body frame, and
the rod body extends in a front-rear direction when seen in a vehicle width direction.

10. The off-road vehicle according to claim 1, wherein the reinforcing frame is a combination of segments that are separatable.

11. A reinforcing frame that is attached to an off-road vehicle during transportation of the off-road vehicle, the reinforcing frame being detachably attachable to a vehicle body frame of the off-road vehicle instead of a roll-over protection structure (ROPS), and operable to couple a first vehicle body frame and a second vehicle body frame to each other, the first vehicle body frame being located forward of a driver's seat of the off-road vehicle, the second vehicle body frame being located rearward of the driver's seat.

12. A method for transporting an off-road vehicle including a vehicle body frame to which a roll-over protection structure (ROPS) is attachable, the method comprising:
attaching a reinforcing frame replacing with the ROPS to the vehicle body frame before transportation of the off-road vehicle, the reinforcing frame operable to couple a first vehicle body frame and a second vehicle body frame of the vehicle body frame to each other, the first vehicle body frame being located forward of a driver's seat of the off-road vehicle, the second vehicle body frame being located rearward of the driver's seat;
transporting the off-road vehicle to which the reinforcing frame is attached; and
detaching the reinforcing frame from the vehicle body frame and attaching the ROPS to the vehicle body frame, after transportation of the off-road vehicle.

13. The method according to claim 12, further comprising:
loading a carrier with off-road vehicles to each of which the reinforcing frame is attached such that the off-road vehicles are arranged in a top-bottom direction, wherein
the carrier is transported in transportation of the off-road vehicles.

14. The method according to claim 13, wherein in loading the carrier with the off-road vehicles, the carrier is loaded with the off-road vehicles in a state where the reinforcing frame is attached to each of the off-road vehicles and the off-road vehicles are ready to run on their own.

15. The method according to claim 12, further comprising:
    replacing a shock absorber attached to the vehicle body frame with an alternative supporter having an overall length shorter than that of the shock absorber.

\* \* \* \* \*